(12) United States Patent
Gao (10) Patent No.: US 11,298,664 B2
(45) Date of Patent: Apr. 12, 2022

(54) NOZZLES, RELATED CARBONATION SYSTEMS, METHODS OF MAKING AND USING THE SAME

(71) Applicant: BEDFORD SYSTEMS LLC, Bedford, MA (US)

(72) Inventor: Qian Gao, North Billerica, MA (US)

(73) Assignee: Bedford Systems LLC, Bedford, MA (US)

( * ) Notice: Subject to any disclaimer, the term of this patent is extended or adjusted under 35 U.S.C. 154(b) by 273 days.

(21) Appl. No.: 16/362,204

(22) Filed: Mar. 22, 2019

(65) Prior Publication Data
US 2019/0291063 A1    Sep. 26, 2019

Related U.S. Application Data

(60) Provisional application No. 62/646,591, filed on Mar. 22, 2018.

(51) Int. Cl.
*B01F 3/04* (2006.01)
*B05B 1/00* (2006.01)
(Continued)

(52) U.S. Cl.
CPC ............ *B01F 3/04808* (2013.01); *A23L 2/54* (2013.01); *B01F 23/2319* (2022.01);
(Continued)

(58) Field of Classification Search
CPC ....... A23L 2/54; A23V 2002/00; B05B 1/005; B05B 1/02; B67D 1/0072; B01F 3/04808;
(Continued)

(56) References Cited

U.S. PATENT DOCUMENTS 1,713,787 A * 5/1929 Stinson .................. B01F 15/02
                                                             261/64.1
2,416,291 A * 2/1947 Detwiler .................. D01D 5/06
                                                             264/180
(Continued)

FOREIGN PATENT DOCUMENTS

CN          1938101 A      3/2007
CN        101869343 A     10/2010
(Continued)

OTHER PUBLICATIONS

International Search Report and Written Opinion for International Application No. PCT/US2019/023664 dated Jul. 4, 2019.
(Continued)

*Primary Examiner* — Charles S Bushey
(74) *Attorney, Agent, or Firm* — Dorsey & Whitney LLP (57) ABSTRACT

Described herein is an example of a nozzle that can include a metal tip having a first end and a second end. The metal tip can also define a conduit extending from the first end towards the second end. The conduit can include a first portion and a second portion. The first portion of the conduit is defined by at least one first interior surface of the metal tip extending from the first end. The first portion of the conduit can exhibit a substantially constant diameter and a first length. The second portion of the conduit is defined by at least one second interior surface of the metal tip extending from the first portion for a second length. The second portion can exhibit a diameter that generally increases with distance from the first portion and can exhibit a generally truncated conical shape exhibiting an open angle.

20 Claims, 7 Drawing Sheets

(51) Int. Cl.
  *B67D 1/00* (2006.01)
  *A23L 2/54* (2006.01)
  *B05B 1/02* (2006.01)
  *B01F 23/23* (2022.01)
  *B01F 23/231* (2022.01)
  *B01F 23/237* (2022.01)
  *B01F 101/14* (2022.01)

(52) U.S. Cl.
  CPC ........ *B01F 23/23121* (2022.01); *B05B 1/005* (2013.01); *B05B 1/02* (2013.01); *B67D 1/0072* (2013.01); *A23V 2002/00* (2013.01); *B01F 23/237621* (2022.01); *B01F 2101/14* (2022.01)

(58) Field of Classification Search
  CPC ............. B01F 3/04248; B01F 3/04439; B01F 2003/049; B01F 2215/0022; B01F 23/2362; B01F 23/2319; B01F 23/23121; B01F 23/237621; B01F 2101/14
  USPC .......................................... 261/76, 77, DIG. 7
  See application file for complete search history.

(56) References Cited

U.S. PATENT DOCUMENTS

| | | | | |
|---|---|---|---|---|
| 4,524,189 | A | * | 6/1985 | Akers, Jr. ................. C08F 8/22 525/356 |
| 4,735,133 | A | * | 4/1988 | Paoletti ............... A47J 31/4489 239/427.3 |
| 4,922,810 | A | * | 5/1990 | Siccardi .................... B01F 5/08 99/323.1 |
| 5,186,363 | A | | 2/1993 | Haynes |
| 5,693,263 | A | * | 12/1997 | Meekel .............. B01D 17/0205 261/64.3 |
| 5,870,944 | A | * | 2/1999 | Vander Zalm ............ A23L 2/54 99/323.2 |
| 6,060,092 | A | * | 5/2000 | Oesterwind ........... B01F 3/0446 222/146.6 |
| 9,416,329 | B2 | * | 8/2016 | Shiode .................. B01F 5/0465 |
| 9,854,935 | B2 | | 1/2018 | Danieli et al. |
| 2016/0008973 | A1 | | 1/2016 | Bensman et al. |
| 2016/0106136 | A1 | | 4/2016 | Gordon et al. |

FOREIGN PATENT DOCUMENTS

| | | |
|---|---|---|
| CN | 106793808 A | 5/2017 |
| CN | 107309532 A | 11/2017 |
| EP | 1523249 B1 | 4/2007 |
| GB | 567192 A | 2/1945 |
| JP | H0626420 A | 2/1994 |
| JP | H06115593 A | 4/1994 |
| SE | 367929 B | 6/1974 |
| WO | 2004016117 A1 | 2/2004 |

OTHER PUBLICATIONS

Extended European Search Report and Opinion for EP Application No. 19771828.1 dated Nov. 18, 2021.

* cited by examiner

NOZZLES, RELATED CARBONATION SYSTEMS, METHODS OF MAKING AND USING THE SAME

CROSS-REFERENCE TO RELATED APPLICATION

The patent application is a non-provisional patent application of, and claims priority to, U.S. Provisional Application No. 62/646,591 filed Mar. 22, 2018, titled "Nozzles, Related Carbonation Systems, Methods of Making and Using the Same," the disclosure of which is hereby incorporated herein by reference in its entirety.

FIELD

The present disclosure relates to nozzles used to introduce gas into a liquid medium, and more particularly, to those used in beverage machines and associated systems.

BACKGROUND

Carbonation systems form carbonated water by dissolving carbon dioxide gas in water. The carbonated water can then be dispensed to a consumer, or mixed with flavoring and other ingredients to prepare a carbonated beverage. However, carbonation systems, especially smaller residential carbonation systems, are typically inefficient. For example, the carbonation systems typically result in a significant portion of the carbon dioxide failing to dissolve in the water. This results in the carbonation systems requiring large amounts of carbon dioxide and a significant amount of time to dissolve a sufficient amount of carbon dioxide in the water.

As such, manufacturers and users of carbonation systems continue to seek new and improved carbonation devices.

SUMMARY

In an embodiment, a nozzle is disclosed. The nozzle includes a metal tip having a first end and a second end. The metal tip defines a conduit extending from the first end towards the second end. The conduit includes a first portion defined by at least one first interior surface of the metal tip. The at least one first interior surface extends from the first end. The first portion exhibits a substantially constant diameter of about 0.35 mm to about 0.41 mm and a length of about 0.17 mm to about 0.23 mm. The conduit also includes a second portion defined by at least one second interior surface of the metal tip. The at least one second interior surface extends from the at least one first interior surface. The second portion exhibits a diameter that increases with distance from the first portion.

In an embodiment, a carbonation system configured to produce carbonated beverages is disclosed. The system includes a coupler configured to be coupled to a gas source and configured to receive a gas from the gas source. The system also includes a water reservoir configured to hold water. The water reservoir includes an inlet and an outlet. Further, the system includes a carbonation device fluidly coupled to the coupler. Additionally, the carbonation system includes a nozzle disposed in the water reservoir and coupled to the carbonation device. The nozzle is configured to dispense the gas received by the coupler into the water reservoir. The nozzle includes a metal tip having a first end and a second end. The metal tip defines a conduit extending from the first end towards the second end. The conduit includes a first portion defined by at least one first interior surface of the metal tip. The at least one first interior surface extends from the first end. The first portion exhibits a substantially constant diameter of about 0.35 mm to about 0.41 mm and a length of about 0.17 mm to about 0.23 mm. The conduit also includes a second portion defined by at least one second interior surface of the metal tip. The at least one second interior surface extends from the at least one first interior surface. The second portion exhibits a diameter that increases with distance from the first portion.

In an embodiment, a method to carbonate a liquid is disclosed. The method includes flowing carbon dioxide through a conduit of a metal tip of a nozzle. The nozzle includes a metal tip having a first end and a second end. The metal tip defines a conduit extending from the first end towards the second end. The conduit includes a first portion defined by at least one first interior surface of the metal tip. The at least one first interior surface extends from the first end. The first portion exhibits a substantially constant diameter of about 0.35 mm to about 0.41 mm and a length of about 0.17 mm to about 0.23 mm. The conduit also includes a second portion defined by at least one second interior surface of the metal tip. The at least one second interior surface extends from the at least one first interior surface. The second portion exhibits a diameter that increases with distance from the first portion. The method also includes dispensing the carbon dioxide from the first portion of the metal tip as a plurality of bubbles into water. The method further includes dissolving the carbon dioxide in the water.

In an embodiment, a method to form a nozzle is disclosed. The method includes injecting a feedstock including a plurality of metal particles and a binder into an injection mold to form a green part. The green part includes a first end and a second end. The green part defines a conduit extending from the first end towards the second end. The conduit includes a first portion defined by at least one first interior surface of the green part. The at least one first interior surface extends from the first end. The conduit includes a second portion defined by at least one second interior surface of the green part. The at least one second interior surface extends from the at least one first interior surface. The second portion exhibits a diameter that increases with distance from the first portion. The method also includes removing the binder from the green part. The method further includes sintering the green part to form a metal tip, wherein sintering the green part includes reducing the size of the green part. After sintering the green part to form a metal tip, the first portion exhibits a substantially constant diameter of about 0.35 mm to about 0.41 mm and a length of about 0.17 mm to about 0.23 mm.

Features from any of the disclosed embodiments can be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments disclosed herein include nozzles, each having a metal tip, carbonation systems including the nozzles, methods to use the nozzles, and methods to form the nozzles. In an example, a nozzle can include a metal tip having a first end and a second end. The metal tip can also define a conduit extending from the first end towards the second end. The conduit can include a first portion and a second portion. The first portion of the conduit is defined by at least one first interior surface of the metal tip. The first interior surface can extend from the first end. The first portion of the conduit can exhibit a substantially constant diameter (e.g., a generally cylindrical shape) and a first length. The second portion of the conduit is defined by at least one second interior surface of the metal tip. The second interior can extend from the first portion for a second length. The second portion can exhibit a diameter that generally increases with distance from the first portion. In an embodiment, the second portion can exhibit a generally truncated conical shape exhibiting an open angle.

The nozzle that includes the metal tip can be used in a carbonation system. In an embodiment, the carbonation system can include a carbonation head that is fluidly coupled to the nozzle. The carbonation head can also be fluidly coupled to a gas source (e.g., a tank of compressed carbon dioxide). The carbonation head can receive the carbon dioxide from the gas source and permit the carbon dioxide to flow through the nozzle. The carbon dioxide can then be dispensed from the nozzle (e.g., from the metal tip of the nozzle), thereby forming a plurality of carbon dioxide bubbles.

The nozzle disclosed herein can improve the efficiency of the carbonation system because the metal tip is configured to emit carbon dioxide bubbles exhibiting a relatively small average diameter. The relatively small average diameter of the carbon dioxide bubbles emitted from the metal tip increases the total surface area of the carbon dioxide bubbles. The rate at which the carbon dioxide bubbles are dissolved in water depends directly on the total surface area of the carbon dioxide bubbles. For example, increasing the total surface area of the carbon dioxide bubbles increases the rate at which the carbon dioxide bubbles are dissolved in water and, in turn, increases the efficiency of the carbonation system.

It was unexpectedly found that certain dimensions of the conduit of the metal tip affect the average diameter of the carbon dioxide bubbles. The dimensions of the conduit of the metal tip that can affect the average size of the carbon dioxide bubbles are the substantially constant diameter of the first portion, the first length of the first portion, the second length of the second portion, and/or the open angle of the second portion (collectively referred to as "the four dimensions"). Each of the four dimensions exhibit critical values. It was unexpectedly found that the metal tip can emit carbon dioxide bubbles exhibiting smaller average diameters when any one of the four dimensions exhibit their critical value. It was also unexpectedly found that the average diameter of the carbon dioxide bubbles noticeably decreases when two or more, in particular three or more, and even more particularly when all of the four dimensions exhibit their critical values. However, it was found that deviating at least one of the four dimensions, and in particular deviating at least two, at least three, or all four dimensions, even slightly from their critical values can noticeably increase the average diameter of the carbon dioxide bubbles emitted from the metal tip.

The nozzles, carbonation systems, and methods disclosed herein can be used in connection with a plurality of different gases. For example, the nozzles, carbonation systems, and methods disclosed herein are described as being used in connection with carbon dioxide. However, the nozzles, carbonation systems, and methods disclosed herein can be used in connection with nitrogen, oxygen, air, or another suitable gas instead of or in conjunction with carbon dioxide.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1A:
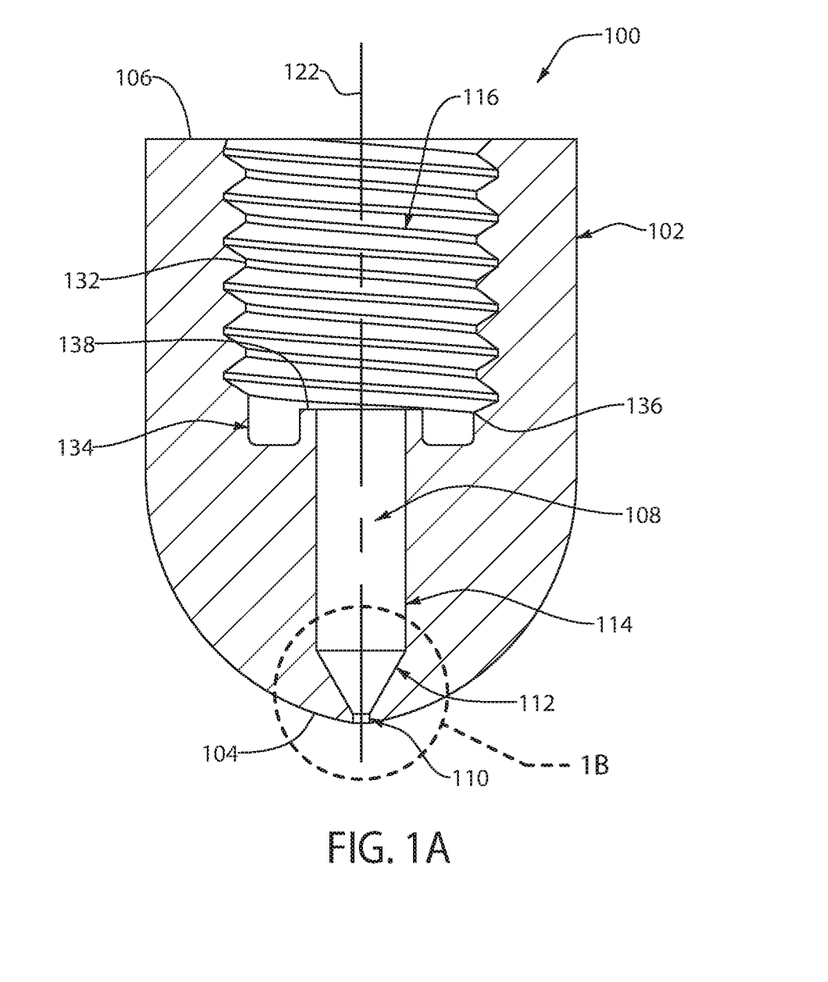
FIG. 1A is a schematic cross-sectional view of a metal tip of a nozzle, according to an embodiment.
Figure 1B:
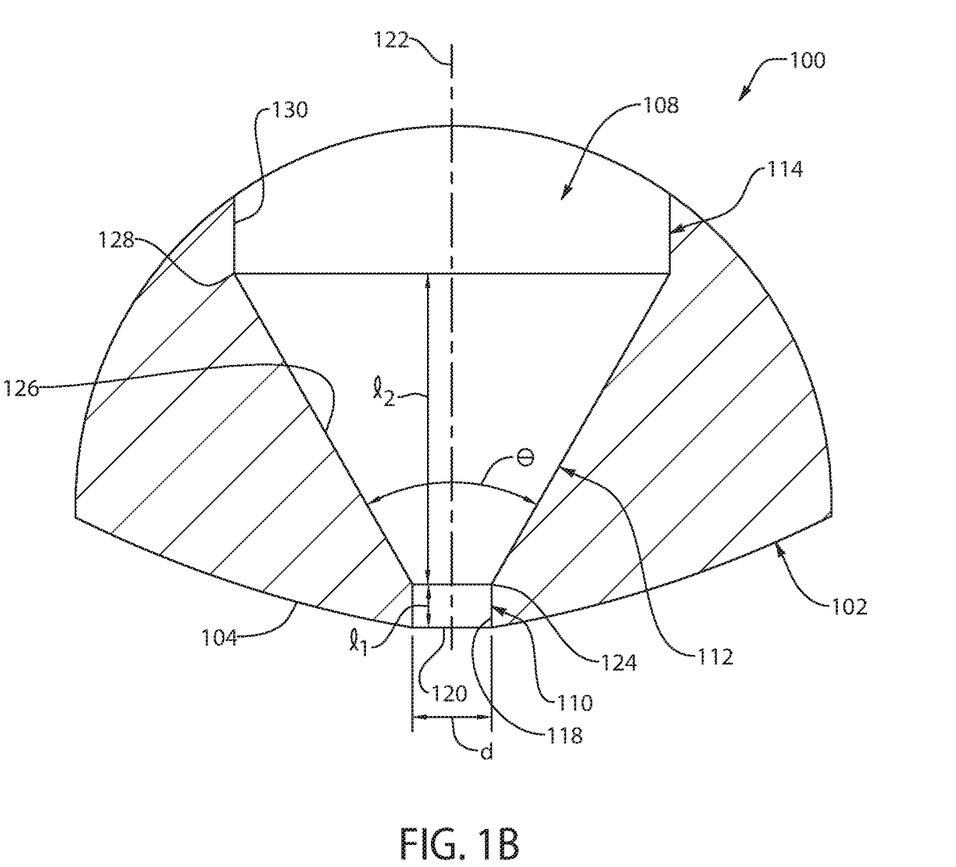
FIG. 1B is an enlarged schematic cross-sectional view of the metal tip taken from the dashed circle 1B shown in FIG. 1A.

FIG. 1A is a schematic cross-sectional view of a metal tip 102 of a nozzle 100, according to an embodiment. FIG. 1B is an enlarged schematic cross-sectional view of the metal tip 102 taken from the dashed circle 1B shown in FIG. 1A. The metal tip 102 includes a first end 104 and a second end 106. The metal tip 102 includes a conduit 108 extend from the first end 104 towards the second end 106. The conduit 108 includes a plurality of portions. For example, the conduit 108 includes a first portion 110 and a second portion 112. The conduit 108 can also include one or more additional portions, such as a third portion 114. The metal tip 102 can also include an inlet 116 extending from second portion 112 to the conduit 108. The inlet 116 can be configured to couple the metal tip 102 to another component of the nozzle 100 (e.g., the plastic stem 142 shown in FIG. 1C) or to another component of a carbonation system (e.g., carbonation head 254 shown in FIG. 2).

Referring to FIG. 1B, the first portion 110 is defined by at least one first interior surface 118 of the metal tip 102. The first interior surface 118 can extend from the first end 104 of the metal tip 102 towards the second end 106 of the metal tip 102. As such, the first portion 110 of the conduit 108 can form an outlet 120 of the metal tip 102. For example, the first portion 110 of the conduit 108 can form the only outlet 120 of the nozzle 100. In an embodiment, the first portion 110 is centered about a centerline 122 of the conduit 108. In such an embodiment, the first interior surface 118 can be extend about the centerline 122.

The first portion 110 can exhibit a first length $l_1$. The first length $l_1$ can be measured from the first end 104 (e.g., from the outlet 120) to an intersection 124 between the first portion 110 and the second portion 112. The first length $l_1$ can also be measured in a direction that is parallel to the centerline 122 of the conduit 108. In an embodiment, the first portion 110 can also exhibit a generally cylindrical shape. In such an embodiment, the first portion 110 can exhibit a substantially constant diameter d. The substantially constant diameter d can be measured in a direction that is substantially traverse to the centerline 122 of the conduit 108. In an embodiment, the first portion 110 can exhibit a non-generally cylindrical shape, such as a generally hyper-rectanglar shape. However, a first portion 110 exhibiting a generally cylindrical shape can emit carbon dioxide bubble exhibiting a smaller average diameter than a first portion 110 exhibiting a non-generally cylindrical shape since the first portion 110 exhibiting the generally cylindrical shape can exhibit the substantially constant diameter d.

The first length $l_1$ and the substantially constant diameter d of the first portion are two of the four dimensions of the conduit 108 that can have a noticeable effect on the average diameter of the carbon dioxide bubbles emitted from the metal tip 102. Each of the first length $l_1$ and the substantially constant diameter d exhibit critical values. When at least one of the first length $l_1$ or the substantially constant diameter d exhibit the critical values thereof, the metal tip 102 emits carbon dioxide bubbles that are noticeably smaller than if the first length $l_1$ or substantially constant diameter d do not exhibit the critical values thereof. Preferably, both the first length $l_1$ and the substantially constant diameter d both exhibit their critical values since the metal tip 102 emits noticeably smaller carbon dioxide bubbles when more than one feature exhibits its critical values, as compared to only one of the first length $l_1$ or the substantially constant diameter d exhibiting its critical value. However, it is noted that deviating the first length $l_1$ or the substantially constant diameter d from its critical value, even slightly, can noticeably increase the average size of the carbon dioxide bubbles, thereby reducing the efficiency of the nozzle.

Regarding the first length $l_1$, it was found that the metal tip 102 emitted the smallest sized carbon dioxide bubbles when the first length $l_1$ is about 0.2 mm. However, it was found that the optimal value for the first length $l_1$ can vary slightly depending on the pressure of the carbon dioxide flowing through the first portion 110, the presence of minor defects in the first portion 110 (e.g., the first portion 110 does not exhibit a perfect cylindrical shape), etc. Additionally, manufacturing issues can result in inadvertent variations in the first length $l_1$. Further, it was found that the size of the carbon dioxide bubbles do not vary noticeably when the first length $l_1$ is varied between 0.17 mm to about 0.23 mm. As such, the critical value of the first length $l_1$ was determined to be about 0.17 mm to about 0.23 mm. Thus, the first length $l_1$ can exhibit its critical values when the first length $l_1$ is about 0.17 mm to about 0.19 mm, about 0.18 mm to about 0.2 mm, about 0.19 mm to about 0.21 mm, about 0.2 mm to about 0.22 mm, about 0.21 mm to about 0.23 mm, about 0.18 mm to about 0.22 mm, about 0.19 mm to about 0.21 mm, about 17 mm, about 18 mm, about 19 mm, about 20 mm, about 21 mm, about 22 mm, or about 23 mm. However, selecting the first length $l_1$ to be less than 0.17 mm or greater than 0.23 mm can have a noticeable effect on the average diameter of the carbon dioxide bubbles emitted from the metal tip 102.

Regarding the substantially constant diameter d, it was found that the metal tip 102 emitted the smallest sized carbon dioxide bubbles when the substantially constant diameter d is about 0.38 mm. However, it was found that the optimal value for the substantially constant diameter d can vary slightly depending on the pressure of the carbon dioxide flowing through the first portion 110, the presence of minor defects in the first portion 110, etc. Additionally, manufacturing issues can result in inadvertent variations in the substantially constant diameter d. Further, it was found that the size of the carbon dioxide bubbles do not vary noticeably when the substantially constant diameter d is varied between 0.35 mm to about 0.41 mm. As such, the critical value of the substantially constant diameter d was determined to be about 0.35 mm to about 0.41 mm. Thus, the substantially constant diameter d can exhibit its critical values when the substantially constant diameter d is 0.35 mm to about 0.37 mm, about 0.36 mm to about 0.38 mm, about 0.37 mm to about 0.39 mm, about 0.38 mm to about 0.40 mm, about 0.39 mm to about 0.41 mm, about 0.36 mm to about 0.40 mm, about 0.37 mm to about 0.39 mm, about 0.36 mm, about 0.37 mm, about 0.38 mm, about 0.39 mm, about 0.40 mm, or about 0.41 mm. However, selecting the substantially constant diameter d to be less than 0.35 mm or greater than 0.41 mm can have a noticeable effect on the average size of the carbon dioxide bubbles emitted from the metal tip 102.

The second portion 112 is defined by at least one second interior surface 126 of the metal tip 102. The second interior surface 126 can extend from the first portion 110 (e.g., from the intersection 124 between the first portion 110 and the second portion 112) towards the second end 106 of the metal tip 102. In an embodiment, the second portion 112 is centered about a centerline 122 of the conduit 108. In such an embodiment, the second interior surface 126 can be extend about the centerline 122.

The second portion 112 can exhibit a second length $l_2$. The second length $l_2$ can be measured from the intersection 124 between the first portion 110 and the second portion 112 to an end of the second portion 112 that is spaced from the first portion 110. The end of the second portion 112 can include an intersection 128 between the second portion 112 and the third portion 114 or an intersection between the second portion 112 and the inlet 116 (not shown). The second length $l_2$ can also be measured in a direction that is parallel to the centerline 122 of the conduit 108.

The second portion 112 is distinguished from the first portion 110 because the second portion 112 exhibits a dimension measured perpendicularly from the centerline 122 (e.g., diameter) that varies with distance from the first end 104 while the first portion 110 exhibit a substantially constant dimension measured perpendicularly from the centerline 122. For example, the second portion 112 exhibits a dimension measured perpendicularly from the centerline 122 that generally tapers (e.g., increases) with distance from the first end 104. The dimension of the second portion 112 can vary continuous (e.g., smoothly) or discontinuously (e.g., the second portion 112 exhibits a stepped geometry). In an embodiment, the second portion 112 exhibits a generally truncated conical shape exhibiting a diameter that generally continuously increases with distance from first end 104. In such an embodiment, the second portion 112 can exhibit an open angle θ that is measured between opposing portions of the second interior surface 126. In an embodiment, the second portion 112 can exhibit a non-generally truncated conical shape (e.g., a truncated prism shape) or a generally truncated conical shape exhibit a diameter that generally discontinuously increases with distance from the first end 104. However, a second portion 112 exhibiting a generally conical shape having a diameter that generally continuously increases can emit carbon dioxide bubble exhibiting a smaller average size than a second portion 112 exhibiting other geometries since the second portion 112 exhibiting a generally conical shape can exhibit the open angle θ.

The second length $l_2$ and the open angle θ of the second portion 112 are two of the four dimensions of the conduit 108 that can have a noticeable effect on the average size of the carbon dioxide bubbles emitted from the metal tip 102. Each of the second length $l_2$ and the open angle θ exhibit critical values. When at least one of the second length $l_2$ or the open angle θ exhibit the critical values thereof, the metal tip 102 emits carbon dioxide bubbles that are noticeably smaller than if the second length $l_2$ or open angle θ do not exhibit their critical values. Preferably, both the second length $l_2$ and the open angle θ exhibit their critical values since the metal tip 102 emits noticeably smaller carbon dioxide bubbles than if only one of the second length $l_2$ or the open angle θ exhibits its critical value. However, it is noted that deviating the second length $l_2$ or the open angle θ from its critical value, even slightly, can noticeably increase the average size of the carbon dioxide bubbles.

Regarding the second length $l_2$, it was found that the metal tip 102 emitted the smallest sized carbon dioxide bubbles when the second length $l_2$ is about 1.6 mm. However, it was found that the optimal value for the second length $l_2$ can vary depending on the pressure of the carbon dioxide flowing through the second portion 112, the presence of minor defects in the second portion 112 (e.g., the second portion 112 does not exhibit a perfect conical shape), etc. Additionally, manufacturing issues can result in inadvertent variations in the second length $l_2$. Further, it was found that the size of the carbon dioxide bubbles do not vary noticeably when the second length $l_2$ is varied between 1.55 mm to about 1.65 mm. As such, the critical value of the second length $l_2$ was determined to be about 1.55 mm to about 1.65 mm. Thus, the second length $l_2$ can exhibit its critical values when the second length $l_2$ is about 1.55 mm to about 1.57 mm, about 1.56 mm to about 1.58 mm, about 1.57 mm to about 1.59 mm, about 1.58 mm to about 1.60 mm, about 1.59 mm to about 1.61 mm, about 1.60 mm to about 1.62 mm, about 1.61 mm to about 1.63 mm, about 1.62 mm to about 1.64 mm, about 1.63 mm to about 1.65 mm, about 1.55 mm to about 1.65 mm, about 1.56 mm to about 1.64 mm, about 1.57 mm to about 1.63 mm, about 1.58 mm to about 1.62 mm, about 1.59 mm to about 1.61 mm, about 1.55 mm, about 1.56 mm, about 1.57 mm, about 1.58 mm, about 1.59 mm, about 1.60 mm, about 1.61 mm, about 1.62 mm, about 1.63 mm, about 1.64 mm, or about 1.65 mm. However, selecting the second length $l_2$ to be less than 1.55 mm or greater than 1.65 mm can have a noticeable effect on the average size of the carbon dioxide bubbles emitted from the metal tip 102.

Regarding the open angle θ, it was found that the metal tip 102 emitted the smallest sized carbon dioxide bubbles when the open angle θ is about 60°. However, it was found that the optimal value for the open angle θ can vary depending on the pressure of the carbon dioxide flowing through the second portion 112, the presence of minor defects in the second portion 112, etc. Additionally, manufacturing issues can result in inadvertent variations in the open angle θ. Further, it was found that the size of the carbon dioxide bubbles do not vary noticeably when the open angle θ is varied between 57° to about 63°. As such, the critical value of the open angle θ was determined to be about 57° to about 63°. Thus, the open angle θ can exhibit its critical values when the open angle θ is about 57° to about 59°, about 58° to about 60°, about 59° to about 61°, about 60° to about 62°, about 61° to about 63°, about 57° to about 63°, about 58° to about 62°, about 59° to about 61°, about 57°, about 58°, about 59°, about 60°, about 61°, about 62°, or about 63°. However, selecting the open angle θ to be less than 57° or greater than 63° can have a noticeable effect on the average size of the carbon dioxide bubbles emitted from the metal tip 102.

As previously discussed, the metal tip 102 forms carbon dioxide bubbles exhibiting small diameters when at least one of the four dimensions exhibit their critical value. However, it is noted that, unexpectedly, is was found that the metal tip 102 forms carbon dioxide bubbles exhibiting even smaller diameters when at least two, and more preferably at least three, and even more preferably all of the four dimensions exhibit their critical values. It is also noted that the first length $l_1$ and the substantially constant diameter can have a greater effect on the average diameter of the carbon dioxide bubbles than the second length $l_2$ and the open angle θ.

As previously discussed, the conduit 108 can include one or more additional portions that extend from the second portion 112 towards the second end 106 of the metal tip 102. For example, the conduit 108 can include a third portion 114 that extends from the second portion 112. The third portion 114 is defined by at least one third interior surface 130 of the metal tip 102. The third interior surface 130 can extend from the second portion 112 towards the second end 106 of the metal tip 102. In an embodiment, the third portion 114 is centered about a centerline 122 of the conduit 108. The third portion 114 can exhibit a length (not shown) measured from the intersection 128 to an end 136 of the third portion 114 that is spaced from the second portion 112. The length of the third portion 114 can also be measured in a direction that is parallel to the centerline 122 of the conduit 108. The length of the third portion 114 can be greater than 0 mm to about 20 mm, such as in ranges of about 0 mm to about 5 mm, about 2.5 mm to about 7.5 mm, about 5 mm to about 10 mm, about 7.5 mm to about 12.5 mm, or about 10 mm to about 20 mm.

The third portion 114 is distinguished from the second portion 112 because the third portion 114 exhibits a substantially constant dimension (e.g., diameter) measured perpendicularly from the centerline 122 while the second portion 112 exhibit a dimension measured perpendicularly from the centerline 122 that varies. For example, the third portion 114 can exhibit a substantially cylindrical shape. In such an embodiment, the substantially constant diameter of the third portion 114 can depend on the substantially constant diameter d of the first portion 110, the second length $l_2$ of the second portion 112, and the open angle θ of the second portion 112. For example, the substantially constant diameter of the third portion 114 can exhibit a substantially constant diameter of about 2 mm to about 3 mm, about 1.5 mm to about 2.5 mm, about 2.5 mm to about 3.5 mm, or greater than 3 mm.

The metal tip 102 includes a metal. For example, the metal tip 102 can include stainless steel, aluminum, or another suitable metal. Forming the metal tip 102 from a metal causes the metal tip 102 to be rigid thereby preventing the metal tip 102 from deforming when pressurized carbon dioxide flows through the conduit 108. For instance, forming the metal tip 102 from a plastic material can cause the metal tip 102 to significantly deform when carbon dioxide flows therethrough. The deformations caused by the plastic material can cause one or more of the four dimensions to deviate from its critical value. Further, forming the metal tip 102 from metal can increase the useful life span of the metal tip 102.

Referring to FIG. 1A, as previously discussed, the inlet 116 of the metal tip 102 can be configured to couple the metal tip 102 to another component of the nozzle 100 or to another component of a carbonation device. In an example, as illustrated, the inlet 116 can include threads 132 that are configured to threadedly couple the metal tip 102 to another component. In an example, the inlet 116 is configured to be coupled to another component via press fitting, a pin, or any other suitable method.

In an embodiment, the metal tip 102 can define an annular channel 134. The annular channel 134 is disposed adjacent to the end 136 of the inlet 116 that is furthest spaced from the second end 106 of the metal tip 102. The annular channel 134 can also extend circumferentially about the conduit 108. In an example, the annular channel 134 can also be spaced from the conduit 108 thereby forming a ridge 138 between the conduit 108 and the annular channel 134.

The annular channel 134 is configured to prevent compressed carbon dioxide from leaking between the metal tip 102 and a component that is coupled to the metal tip 102. In an example, the annular channel 134 can include an O-ring 140 (shown in FIG. 1C) disposed therein. In such an example, the component that is coupled to the metal tip 102 can press against the O-ring 140 thereby forming a fluid tight seal between the metal tip 102 and the component. In an example, the annular channel 134 is configured to have a portion of the component that is coupled to the metal tip 102 disposed therein thereby creating a tortuous path. The tortuous path can create resistance that inhibits the carbon dioxide from leaking between the metal tip 102 and the component that is coupled to the metal tip 102.

Figure 1C:
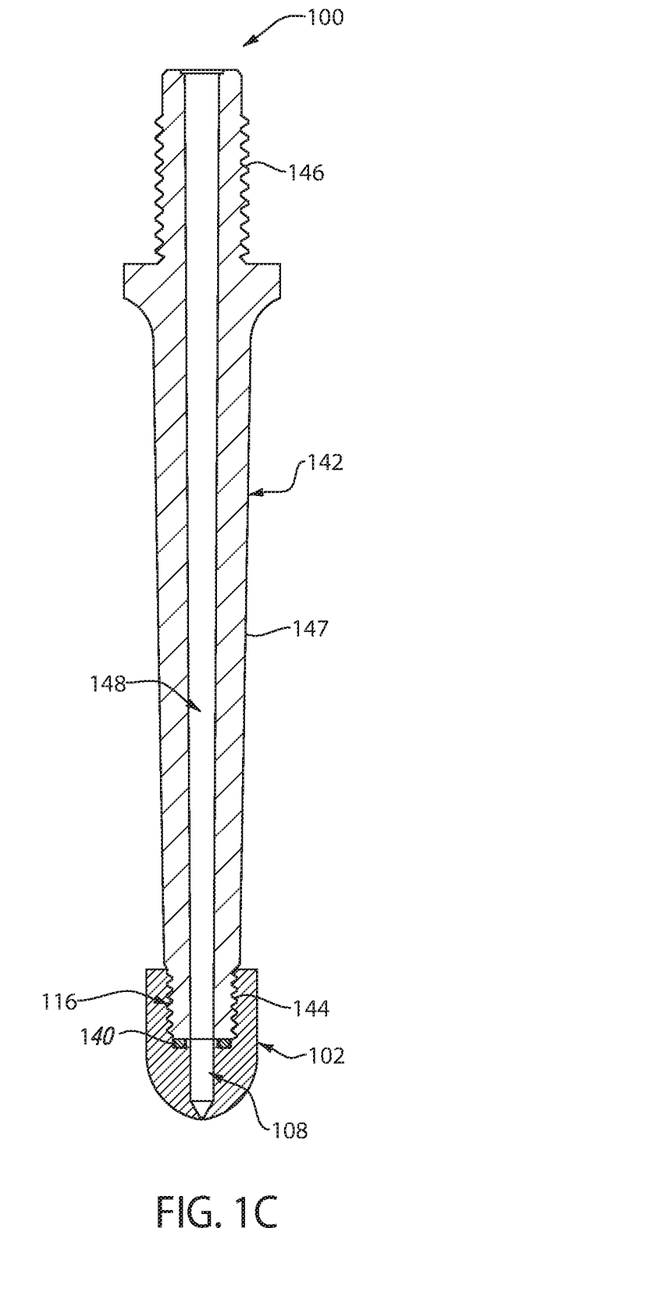
FIG. 1C is a schematic cross-sectional view of the nozzle including the metal tip coupled to a plastic stem, according to an embodiment.

FIG. 1C is a schematic cross-sectional view of the nozzle 100 including the metal tip 102 coupled to a plastic stem 142, according to an embodiment. The plastic stem 142 can include a first end 144, a second end 146, and a body 147 extending between the first end 144 and the second end 146. The first end 144 of the plastic stem 142 can be configured to be disposed in and coupled to the inlet 116 of the metal tip 102 using any of the methods disclosed herein. For example, as illustrated, the first end 144 of the plastic stem 142 can be configured to be threadedly coupled to the inlet 116 of the metal tip 102. The second end 146 of the plastic stem 142 can be configured to be coupled to another component (not shown), such as a carbonation head (e.g., carbonation head 254 of FIG. 2). The body 147 of the plastic stem 142 can exhibit an elongated shape thereby causing the plastic stem 142 to exhibit an elongated shape. In a particular embodiment, the second end 146 of the plastic stem 142 can be configured to be coupled to a component that is spaced from a reservoir (e.g., water reservoir 252 of FIG. 2 since the elongated shape of the plastic stem 142 enables the nozzle 100 to be disposed in the reservoir.

The plastic stem 142 defines an elongated conduit 148 that extends from the first end 144 of the plastic stem 142 to the second end 146 of the plastic stem 142. The elongated conduit 148 can be configured to be fluidly coupled to the metal tip 102. This allows carbon dioxide that is in the elongated conduit 148 (e.g., carbon dioxide received from the carbonation head 254 of FIG. 2) to flow into the conduit 108 of the metal tip 102.

Figure 2:
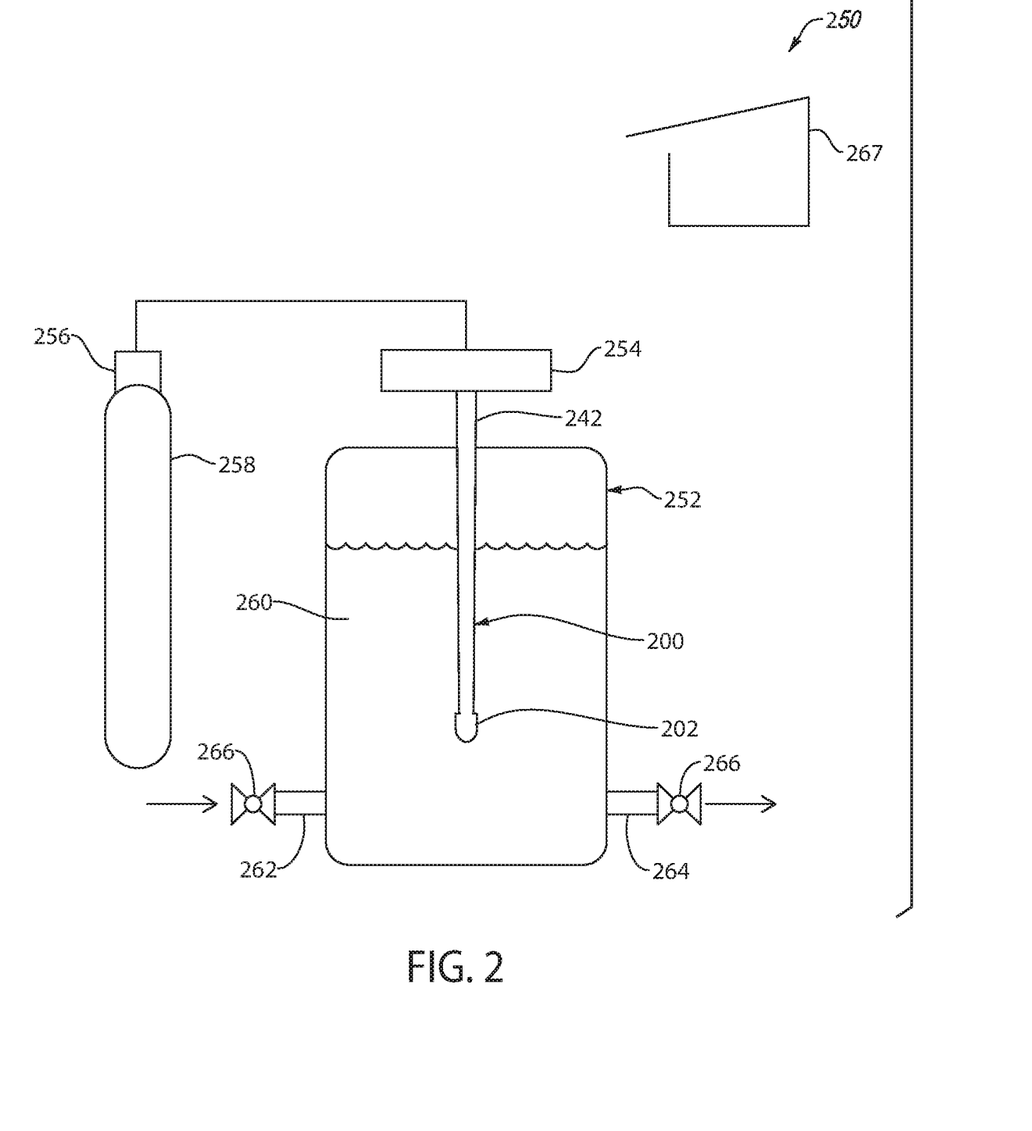
FIG. 2 is a schematic of a carbonation system, according to an embodiment.

FIG. 2 is a schematic of a carbonation system 250, according to an embodiment. The carbonation system 250 includes a water reservoir 252 that is configured to hold water 260 therein and a nozzle 200 that is at least partially disposed in the water reservoir 252. The nozzle 200 can be the same or similar to the nozzle 100 of FIGS. 1A-1C. For example, the nozzle 200 includes a metal tip 202 and can include a plastic stem 242. The carbonation system 250 further includes a carbonation head 254 that is coupled to the nozzle 200. The carbonation system 250 also includes a coupler 256 that is fluidly coupled to the carbonation head 254 and configured to be coupled to a gas source 258. Thus, the coupler 256 can received carbon dioxide from the gas source 258 and provide the carbon dioxide to the carbonation head 254.

As previously discussed, the water reservoir 252 is configured to hold water 260. The water reservoir 252 can also be configured to store a pressured fluid therein. For example, the introduction of the carbon dioxide gas via the nozzle 200 can cause the pressure inside the water reservoir 252 to be greater than atmospheric pressure. The increased pressure inside the water reservoir 252 can increase the amount of carbon dioxide that dissolves in the water 260.

The water reservoir 252 can include a water inlet 262 and a water outlet 264. The water inlet 262 can be fluidly coupled to a water source (not shown) thereby allowing water 260 to enter the water reservoir 252. The water outlet 264 can allow the water 260 to exit the water reservoir 252 after the water 260 is carbonated. For example, the water outlet 264 can be fluidly coupled to a dispenser (not shown) that is configured dispense the water 260 into a cup or other water-holding container.

In an embodiment, the carbonation system 250 can include one or more valves 266 fluidly coupled to or integrally formed with both the water inlet 262 and the water outlet 264. The valves 266 can be configured to be selectively opened and closed. For example, the valves 266 can be configured to open and closed responsive to direction from a controller 267. The valves 266 can be configured to open when fresh water (e.g., noncarbonated water) is added to the water reservoir 252 and/or when carbonated water is removed from the water reservoir 252. The valves 266 can be configured to close when carbon dioxide is introduced into the water reservoir 252. As such, the valves 266 can prevent the water 260 from exiting the water reservoir 252 when the pressure inside the water reservoir 252 increases due to the introduction of the carbon dioxide. In an embodiment, the water reservoir 252 can include a chiller that is configured to cool the water 260 or one or more additional components that are configured to facilitate the operation of the water reservoir 252 (e.g., facilitate dissolving the carbon dioxide in the water 260).

As previously discussed, the carbonation head 254 is configured to have the nozzle 200 coupled thereto. The carbonation head 254 can also be configured to support the nozzle 200. As such, the carbonation head 254 can include any component or device that can be coupled to and support the nozzle 200. In an example, the carbonation head 254 can include tubing (e.g., rigid tubing) that is couplable to the nozzle 200. In an embodiment, the carbonation head 254 can include a coupling between tubing (e.g., tubing extending from the coupler 256) and the nozzle 200.

In an embodiment, the carbonation head 254 is spaced from the water reservoir 252. In such an embodiment, the plastic stem 242 of the nozzle 200 can extend from the carbonation head 254 into the water reservoir 252. In an embodiment, the carbonation head 254 can be at least partially disposed in the water reservoir 252. In such an embodiment, the nozzle 200 can include a plastic stem 242 extending from the carbonation head 254 such that the metal tip 202 is optimally positioned in the water reservoir 252 or the metal tip 202 can be directly coupled to the carbonation head 254 (e.g., the plastic stem 242 is omitted from the nozzle 200).

As previously discussed, the coupler 256 is configured to be coupled to a gas source 258. The structure of the coupler 256 can depend on the gas source 258. In an embodiment, the gas source 258 is tank of compressed carbon dioxide. In such an embodiment, the coupler 256 can include an adapter that is configured to be coupled to the tank of compressed carbon dioxide. In an embodiment, the gas source 258 includes a cartridge of carbon dioxide. In such an embodiment, the coupler 256 can be configured to hold the cartridge of carbon dioxide and puncture the cartridge. In an embodiment, the gas source 258 includes a solid carbon dioxide source disposed in a container, such as seltzer, charged adsorbent, charcoal or other molecular sieve, carbon nanotubes, etc. In such an example, the coupler 256 can be configured to puncture the container and receive the carbon dioxide from the solid carbon dioxide source. In an example, the solid carbon dioxide source can be configured to release the carbon dioxide when exposed to water. In such an example, the coupler 256 can include a water source. In an embodiment, the gas source 258 is disposed in a container that also includes flavorings or other ingredients (e.g., alcohol). For example, the container can include at least two chambers, one including the gas source 258 and another including flavorings or other ingredients (e.g., alcohol). In such an example, the coupler 256 is configured to only access the chamber that includes the gas source 258 while the carbonation system 250 includes another device (not shown) that is configured to access the chamber that includes the flavorings or other ingredients.

The carbonation system 250 can include additional components that are not illustrated in FIG. 2. For example, the carbonation system 250 can include addition valves, a support structure that is configured to receive and hold the gas source 258, a dispenser fluidly coupled to the water outlet 264, a housing that includes at least some of the components of the carbonation system 250 disposed therein, etc. Examples of carbonation systems that include additional components are disclosed in U.S. Patent Application Publication No. 2016/008973 and U.S. Patent Application Publication No. 2016/0106136, the disclosures of each of which are incorporated herein, in their entirety, by this reference.

Figure 3:
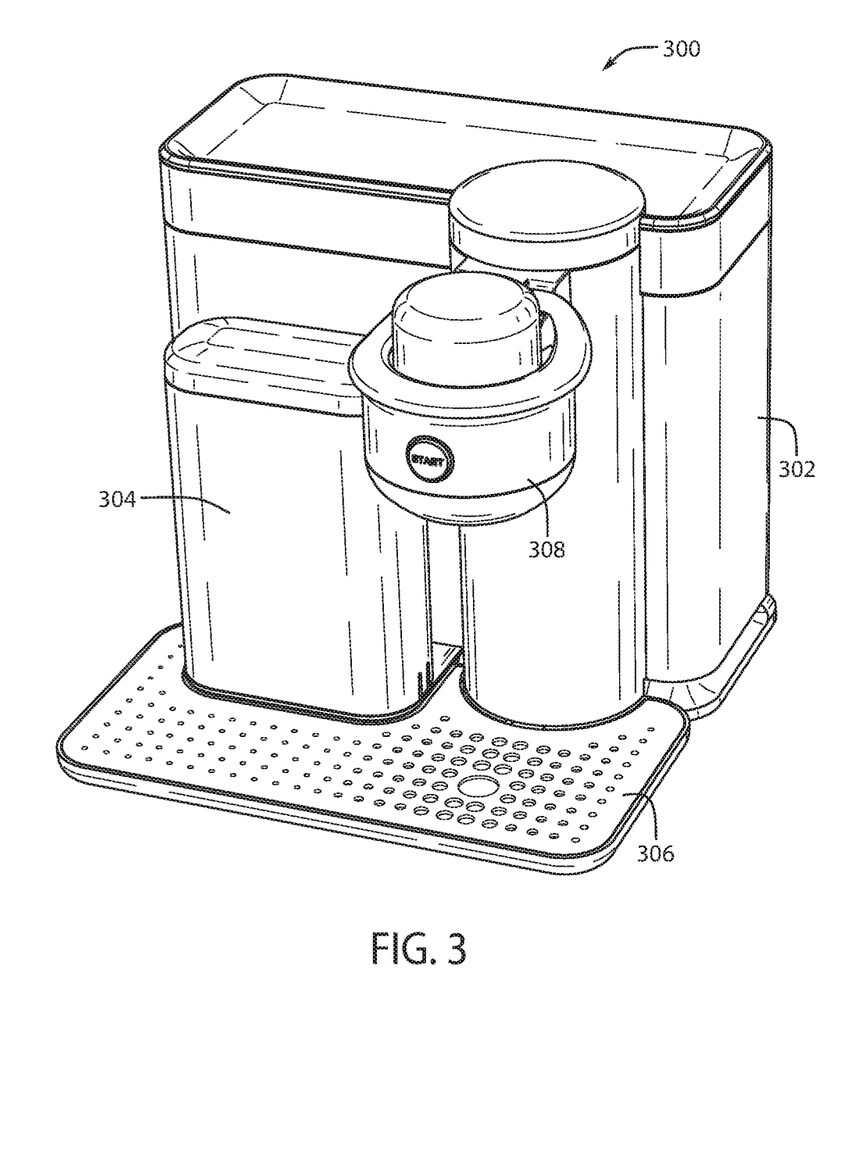
FIG. 3 is an isometric view of a beverage appliance or machine accordance with various aspects of the present disclosure.

The carbonation system 250 can be used in a variety of applications and appliances. FIG. 3 presents an example beverage machine 300 that can implement the carbonation system 250 and/or one or more of nozzles described herein, such as the nozzle 100 or the nozzle 200. In particular, an isometric view of the beverage appliance or machine 300. The beverage machine 300 can include a housing 302 that shields various components of the machine, a reservoir 304 that holds a liquid (e.g., water) used to form a beverage, and a drip tray 306 that supports a user's cup or other container for receiving a dispensed beverage.

The reservoir 304 can be removable from the housing 302 such that a user can fill the reservoir 304 with a beverage precursor liquid, such as water, that is used to form a beverage dispensed at a dispensing station 308 into a user's container. The reservoir 304 can include a movable lid to facilitate a user in filling the reservoir 304 with the precursor liquid. In various examples, the reservoir 304 can be replaced by a plumbed connection to a direct or main water source. The beverage precursor liquid can be any suitable liquid, including water or any other suitable liquid used to form a beverage. The reservoir 304 or main water source can form part of a beverage precursor supply which provides the beverage precursor liquid for conditioning of some kind (e.g., filtering, chilling, carbonating, mixing with a beverage medium, and subsequent dispensing as a beverage). In this regard, the reservoir 304 can be used to supply water to the water reservoir 252 (FIG. 2) for carbonation with the carbonation system 250. Additionally or alternatively, the reservoir 304 can be or be used to perform the function described with respect to the water reservoir 252.

To illustrate, various components of the beverage machine 300 can be located within the housing 302. For example, a pump can be located within the housing 302 and can move precursor liquid from the reservoir 304 to a carbonation system, where the precursor liquid can be carbonated via a gas (e.g., using the carbonation system 250 of FIG. 2). Depending on the particular application, the gas can be supplied by a pressurized canister or bottle, such as a carbon dioxide canister or bottle, located within the housing 302. In some examples, the precursor liquid can be chilled by a cooling system, either before, during, or after carbonation. Cooling the precursor liquid during carbonation can help the carbonation process. For instance, a cooler liquid tends to dissolve carbon dioxide or other gas more rapidly and/or is capable of dissolving a larger amount of gas. In some examples, the precursor liquid is cooled to about four degrees Celsius or lower to facilitate carbonation of the precursor liquid.

The carbonated liquid can be moved to the dispensing station 308 and dispensed into a container, such as that which might be arranged on the drip tray 306. To generate a desired beverage, the carbonated liquid can be mixed with a beverage medium (e.g., a flavoring agent) contained in a beverage cartridge or pod. The beverage medium can be emptied from the beverage pod in many ways. For instance, the beverage medium can drain from the beverage pod by gravity. Additionally or alternatively, the beverage medium can be moved out of the beverage pod by introducing gas or fluid into the beverage pod under pressure, as explained more fully below.

Control of the beverage machine 300 and its components can be performed by control circuitry, which can include a programmed general purpose computer and/or other data processing devices along with suitable software or other operating instructions, one or more memories (including non-transient storage media that can store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as a user interface to display information to a user and/or receive input from a user), communication buses or other links, a display, switches, relays, triacs, motors, mechanical linkages and/or actuators, and/or other components necessary to perform desired input/output or other functions of the beverage machine 300.

Figure 4:
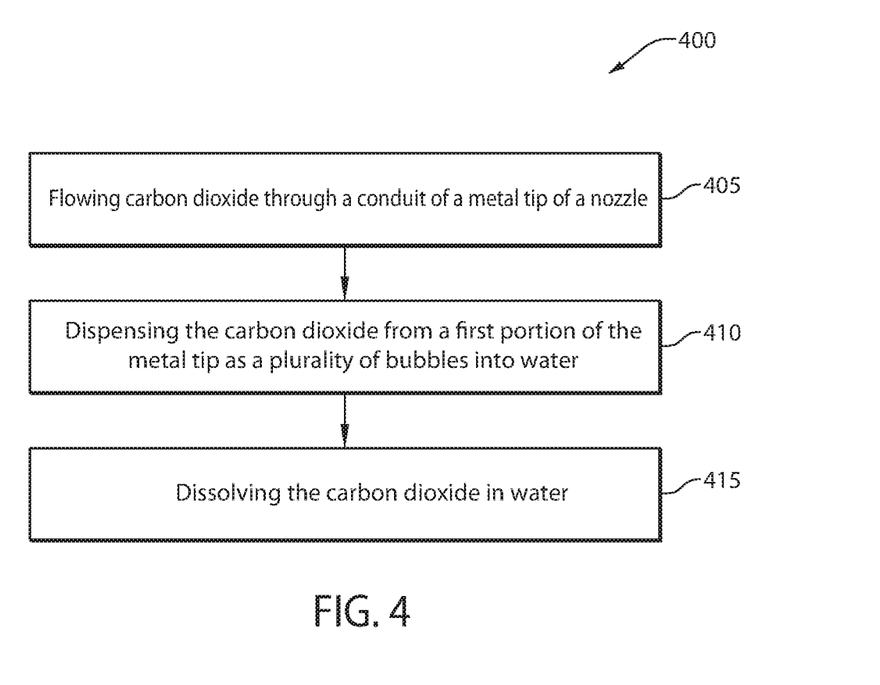
FIG. 4 is a flow chart of a method of using the nozzles and carbonation systems disclosed herein, according to an embodiment.

FIG. 4 is a flow chart of a method 400 of using the nozzles and carbonation systems disclosed herein, according to an embodiment. The method 400 can include operations, functions, or actions as illustrated by at least one of acts 405, 410, or 415. The acts 405, 410, and 415 can be performed in response to direction from a controller.

The method 400 illustrated in FIG. 4 is provided for illustrative purposes. As such, it is contemplated that the method 400 can be changed. For example, the acts can be performed in a different order than the order illustrated in FIG. 4. For example, at least one of the acts 405, 410, or 415 can be divided into additional acts, modified, supplemented, or combined with another act.

The method 400 can begin with act 405, which recites "flowing carbon dioxide through a conduit of a metal tip of a nozzle." For example, act 405 can include flowing the carbon dioxide through any of the metal tips disclosed herein. As such, act 405 includes flowing the carbon dioxide through the conduit where at least one (e.g., at least two, at least three, or four) of the four dimensions exhibit their critical values. While there is no upper limit on the pressure that the carbon dioxide gas exhibits as it flows through the metal tip, real world conditions and system safety can present a reasonable upper limit on the pressure of the carbon dioxide gas. According to one exemplary embodiment, the pressure of the carbon dioxide gas flowing through the metal tip can exhibit a pressure of about 1.28 MPa to about 8.27 MPa, such as in ranges of about 1.28 MPa to about 4.5 MPa or about 4.5 MPa to about 8.27 MPa. Carbon dioxide gas flow pressures below this range will result in larger than desired bubble size.

Act 405 can be followed by act 410, which recites "dispensing the carbon dioxide from a first portion of the metal tip as a plurality of bubbles into water." Act 410 can include emitting carbon dioxide bubbles exhibiting a relatively small diameter because act 405 includes flowing carbon dioxide through the conduit where at least one of the four dimensions of the conduit exhibit the critical value thereof. The size of the bubbles can depend on the pressure of the carbon dioxide flowing through the metal tip, the temperature of the water, which of the four dimensions exhibit their critical value, etc.

Act 410 can be followed by act 415, which recites "dissolving the carbon dioxide in water." Act 410 can include dissolving a significant portion of the carbon dioxide into the water because of the relatively small diameters of the carbon dioxide bubbles. For example, act 410 can include dissolving at least 22% of the carbon dioxide that is emitted from the metal tip in the water, such as at least about 28% or 58%. Water temperature and the amount of water the carbon dioxide gas is being dissolved into can also affect efficiency. Water between 4° C. and 0° C. exhibits the highest efficiency, and the larger the volume of water receiving the carbon dioxide, the better the dissolution efficiency becomes.

The method 400 can include one or more additional acts that are not illustrated in FIG. 4. In an example, the method 400 can include, before act 405, receiving carbon dioxide from a gas source at a coupler, flowing the carbon dioxide from the coupler to the carbonation head, and flowing the carbon dioxide from the carbonation head into the nozzle. Further, flowing the carbon dioxide from the carbonation head into the nozzle can include flowing the carbon dioxide through a plastic stem of the nozzle. In an example, the method 400 can include controllably opening and closing one or more values to control the flow of the carbon dioxide, the flow of water into a water reservoir, etc. In an example, method 400 can include, after act 415, removing carbonated water from a water reservoir and dispensing the carbonated water into a cup or another suitable apparatus. In such an example, the method 400 can also include mixing the carbonated water with flavoring or other ingredients before or substantially simultaneously with dispensing the carbonated water.

Manufacturing metal tips of the nozzles disclosed herein can be difficult due to the relatively small size of the conduit. For example, many common manufacturing techniques, such as casting and machining, are unable to form the metal tips without extremely high costs, long manufacturing times, and/or high discard rates because the methods cannot form the metal tips within certain tolerances (e.g., tolerances for the four dimensions that are within their critical ranges). However, it has been found that metal injection molding can form the metal tips disclosed herein. For example, metal injection molding can quickly and cheaply form the metal tips to specific tolerances.

Figure 5:
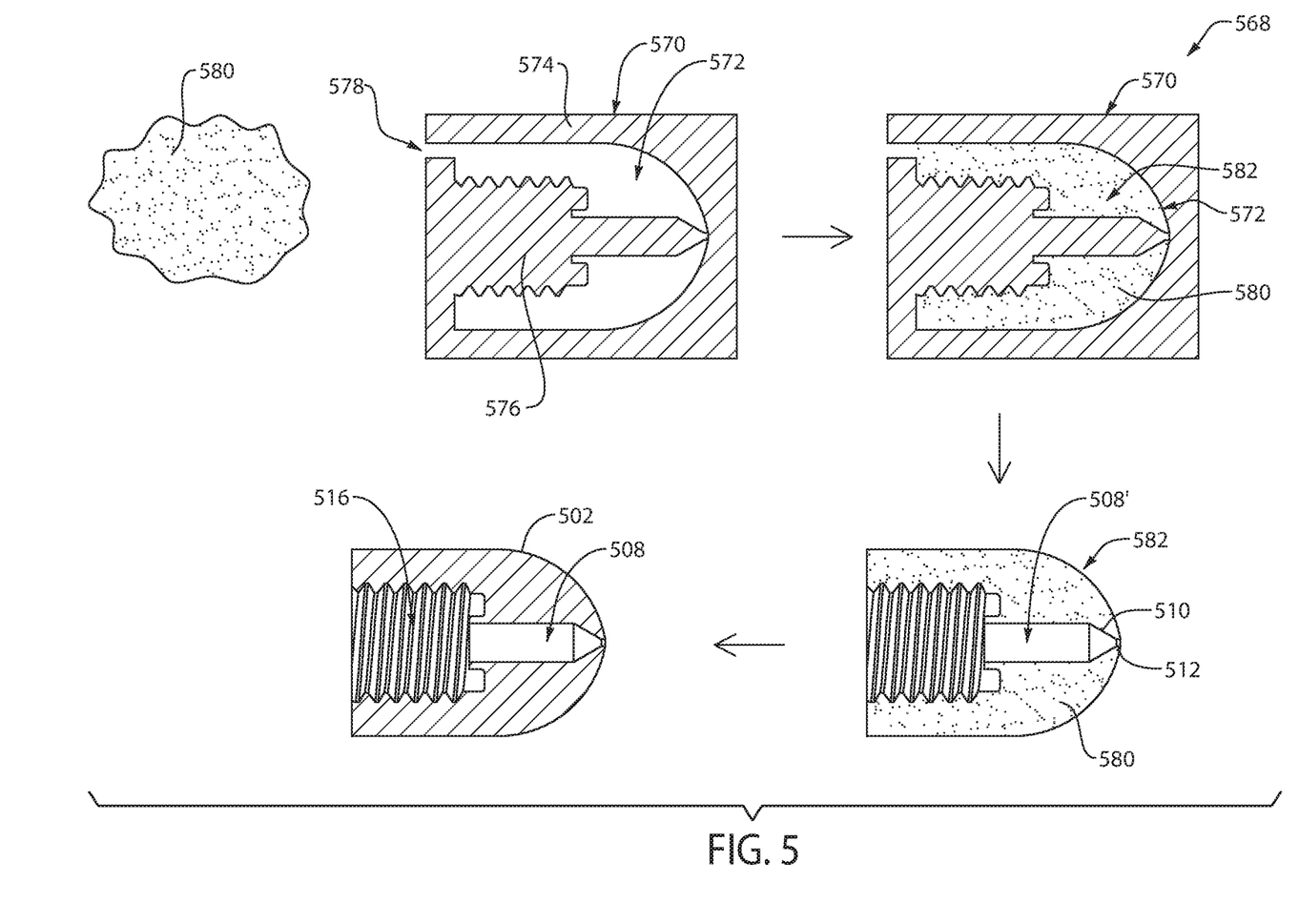
FIG. 5 is a schematic cross-sectional view of a method to form a metal tip using a metal injection molding technique, according to an embodiment.

FIG. 5 is a schematic cross-sectional view of a method 568 to form a metal tip 502 using a metal injection molding technique, according to an embodiment. For example, the method 568 includes providing a mold 570. The mold 570 can be formed from at least one piece, such as two or more pieces. The mold 570 can define a cavity 572 that generally corresponds to the shape of the metal tip 502. For example, the mold 570 can include an outer portion 574 that generally corresponds to an exterior surface of the metal tip 502. The mold 570 can also include an inner portion 576 that generally corresponds to the same of the inlet 516 and the conduit 508 of the metal tip 502. However, as will be discussed in more detail below, the cavity 572 can be slightly larger than the metal tip 502. The mold 570 also includes at least one inlet 578 formed therein.

The method 568 also includes providing a feedstock 580. The feedstock 580 includes a plurality of metal particles mixed with a binder. The metal particles can include stainless steel particles, aluminum particles, or another suitable metal particle. The binder can include wax, polyethylene, polypropylene, stearic acid, polyoxymethylene, and the like. In an example, providing the feedstock 580 can include mixing the metal particles with the binder.

The method 568 includes injecting the feedstock 580 into the cavity 572 to form a green part 582. For example, the method 568 can include injecting the feedstock 580 into the mold 570 via the inlet 578.

The method 568 can include, after injecting the feedstock 580 into the cavity 572, removing the green part 582 from the mold 570. The green part 582 can exhibit sufficient strength that the green part 582 exhibits the shape of the cavity 572 after the green part 582 is removed from the mold 570.

The method 568 includes removing the binder from the green part 582. For example, the method 568 can include removing the binder from the green part 582 using a thermal debinding process, a catalytic debinding process, or a solvent debinding process. Removing the binder from the green part 582 can cause the green part 582 to exhibit high porosity (e.g., a porosity of at least 5 vol. %, at least 10 vol. %, at least 25 vol. %, or at least 40 vol. %).

The method 568 can include sintering the green part 582 to form the metal tip 502. Sintering the green part 582 can include heating the green part 582 to a temperature near a melting point of the metal particles. Heating the green part 582 to such high temperatures can cause the metal particles to diffuse (e.g., bond) together to form the metal tip 502. Diffusing the metal particles together can also decrease the porosity of the green part 582 thereby decreasing the volume of the green part 582. For example, the green part 582 can define a conduit 508' including a first portion 510 and a second portion 512. The first portion 510 can include a substantially constant diameter and a first length that is outside of the critical values disclosed herein and the second portion 512 can include a second length and an open angle that is different than the critical values disclosed herein. However, at least one the substantially constant diameter, the first length, the second length, and the open angle of the green part 582 can be selected such to exhibit their critical value after the volume of the green part 582 decreases during the sintering step. In an embodiment, the method 568 can include sintering the green part 582 in an inert atmosphere (e.g., argon or nitrogen atmosphere) to prevent oxidation of the green part 582 or the metal tip 502 during the sintering process.

In an embodiment, the method 568 includes sintering the green part 582 after removing the binder from the green part 582. In an embodiment, the method 568 includes sintering the green part 582 substantially simultaneously with removing the binder from the green part 582. For example, the binder from the green part 582 can be removed by disposing the green part 582 in a furnace and heating the green part 582 to a temperature that is sufficient to remove the binder. After removing the binder from the green part 582, the furnace can heat the green part 582 to a temperature near the melting point of the metal particles thereby sintering the green part 582 into the metal tip 502.

While various aspects and embodiments have been disclosed herein, other aspects and embodiments are contemplated. The various aspects and embodiment disclosed herein are for purposes of illustration and are not intended to be limiting. Additionally, the words "including," having," and variants thereof (e.g., "includes" and "has") as used herein, including the claims, shall be open ended and have the same meaning as the word "including" and variants thereof (e.g., "include" and "includes").

What is claimed is:

1. A nozzle for a carbonation system, comprising:
   a metal tip having a first end and a second end, the metal tip defining a conduit extending from the first end towards the second end, the conduit comprising:
   a first portion defined by at least one first interior surface of the metal tip, the at least one first interior surface extending from the first end, the first portion exhibiting a length of about 0.17 mm to about 0.23 mm and a substantially constant diameter of about 0.35 mm to about 0.41 mm along the length; and
   a second portion defined by at least one second interior surface of the metal tip, the at least one second interior surface extending from the at least one first interior surface, the second portion exhibiting a diameter that increases with distance from the first portion.

2. The nozzle of claim 1, wherein the metal tip comprises stainless steel.

3. The nozzle of claim 1, wherein the second portion exhibits a generally conical shape exhibiting an opening angle of about 60°.

4. The nozzle of claim 1, wherein the second portion exhibits a length of about 1.55 mm to about 1.65 mm, and wherein the length of the second portion is measured parallel to a centerline of the conduit from an intersection of the first portion and the second portion to an opposing end of the second portion.

5. The nozzle of claim 1, wherein the conduit further comprises a third portion defined by at least a third interior surface of the metal tip, the at least third interior surface extending from the at least one second interior surface, the third portion exhibiting a substantially constant diameter of about 1.5 mm to about 2.5 mm.

6. The nozzle of claim 1, wherein the metal tip further comprises an inlet extending from the second end of the metal tip to the conduit.

7. The nozzle of claim 6, wherein the metal tip further comprises an annular channel disposed adjacent to an end of the inlet spaced furthest from the second end of the metal tip and extending circumferentially about the conduit.

8. The nozzle of claim 7, further comprising an o-ring disposed in the annular channel.

9. The nozzle of claim 6, further comprising a plastic stem exhibiting an elongated shape, the plastic stem positioned in the inlet and coupled to the metal tip, the plastic stem defining an elongated conduit fluidly coupled to the conduit.

10. A carbonation system configured to produce carbonated beverages, the system comprising:
    a coupler configured to be coupled to a gas source and configured to receive a gas from the gas source;
    a water reservoir configured to hold water, the water reservoir comprising an inlet and an outlet;
    a carbonation head fluidly coupled to the coupler; and
    the nozzle of claim 1 disposed in the water reservoir and coupled to the carbonation head, the nozzle configured to dispense the gas received by the coupler into the water reservoir.

11. The carbonation system of claim 10, wherein the second portion exhibits a generally conical shape exhibiting an opening angle of about 60°.

12. The carbonation system of claim 10, wherein the second portion exhibits a length of about 1.55 mm to about 1.65 mm, wherein the length of the second portion is measured parallel to a centerline of the conduit from an intersection of the first portion and the second portion to an opposing end of the second portion.

13. The carbonation system of claim 10, further comprising the gas source coupled to the coupler, the gas source holding carbon dioxide therein.

14. A method to carbonate a liquid, the method comprising:
    flowing carbon dioxide through the nozzle of claim 1;
    dispensing the carbon dioxide from the first portion of the metal tip as a plurality of bubbles into water; and
    dissolving the carbon dioxide in the water, thereby forming carbonated water.

15. The method of claim 14, further comprising, before flowing carbon dioxide through the conduit of the metal tip of the nozzle, flowing the carbon dioxide through an elongated channel of a plastic stem of the nozzle, the plastic stem coupled to the metal tip.

16. The method of claim 14, wherein the second portion exhibits a generally conical shape exhibiting an opening angle of about 60°.

17. The method of claim 14, further comprising releasing the carbonated water toward a dispenser of a beverage machine.

18. The nozzle of claim 1, wherein the length of about 0.17 mm to about 0.23 mm and the substantially constant diameter of about 0.35 mm to about 0.41 mm are configured to reduce an average carbon dioxide bubble size emitted from the metal tip.

19. The nozzle of claim 1, wherein the length of about 0.17 mm to about 0.23 mm and the substantially constant diameter of about 0.35 mm to about 0.41 mm are configured to increase dissolution of carbon dioxide bubbles emitted from the metal tip.

20. The nozzle of claim 19, wherein the length of about 0.17 mm to about 0.23 mm and the substantially constant diameter of about 0.35 mm to about 0.41 mm cooperate to define the carbon dioxide bubbled dissolution rate to at least about 28% or 58% when emitted into water between 0° C. and 4° C.

* * * * *